July 14, 1964 M. CLAR 3,140,787
SELF-LOADING VEHICLE
Filed April 11, 1962 4 Sheets-Sheet 2
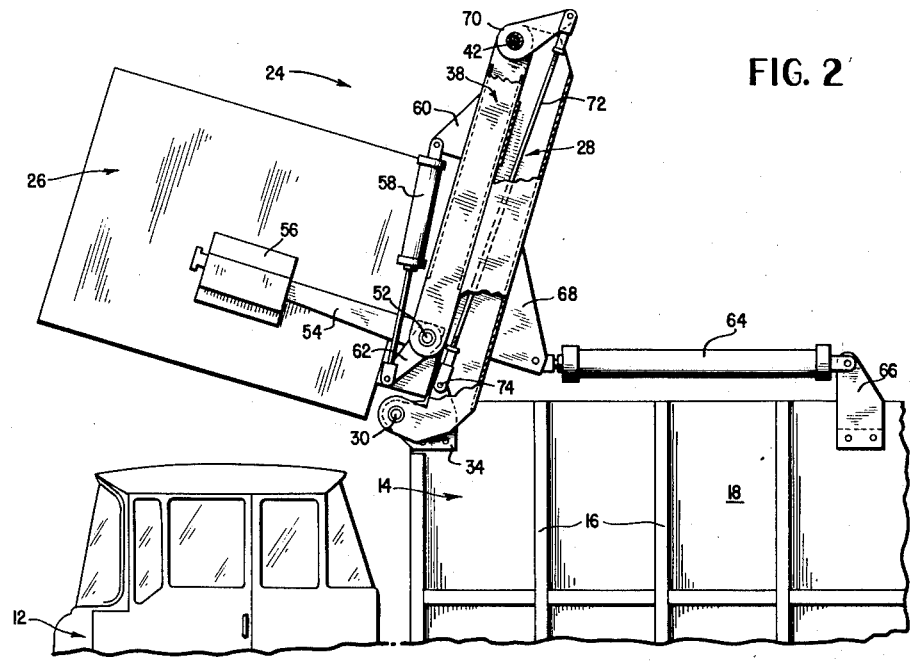
FIG. 2
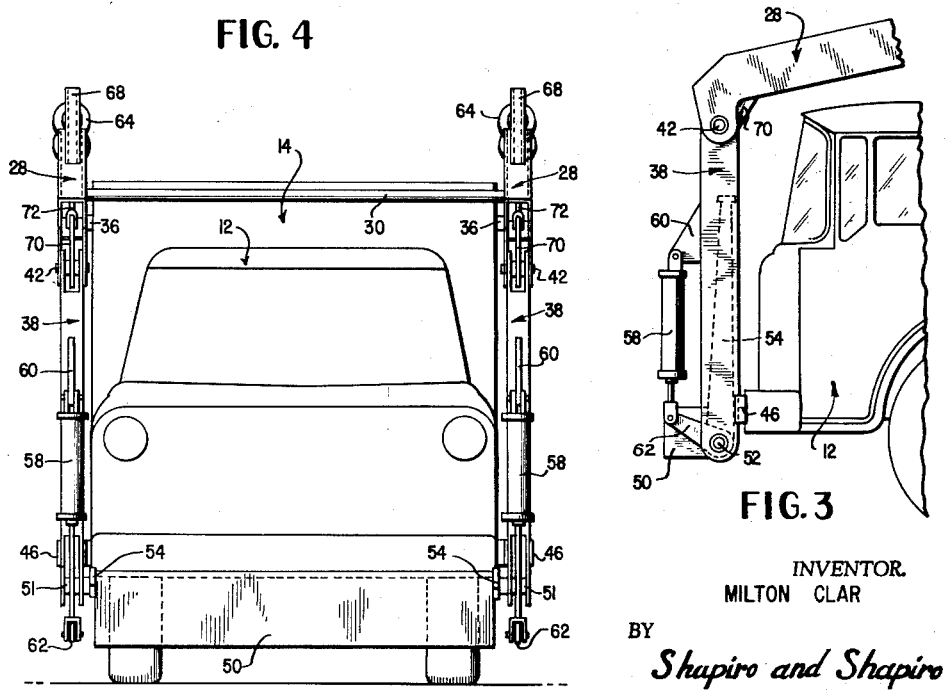
FIG. 4
FIG. 3
INVENTOR.
MILTON CLAR
BY
*Shapiro and Shapiro*
ATTORNEYS.

July 14, 1964  M. CLAR  3,140,787
SELF-LOADING VEHICLE
Filed April 11, 1962  4 Sheets-Sheet 3
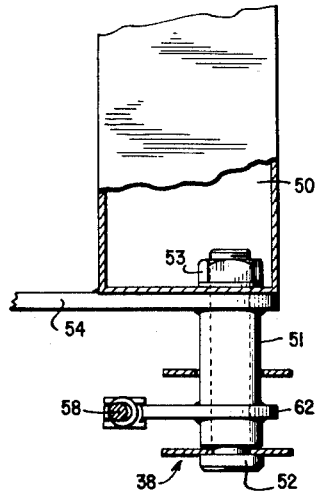
FIG. 5
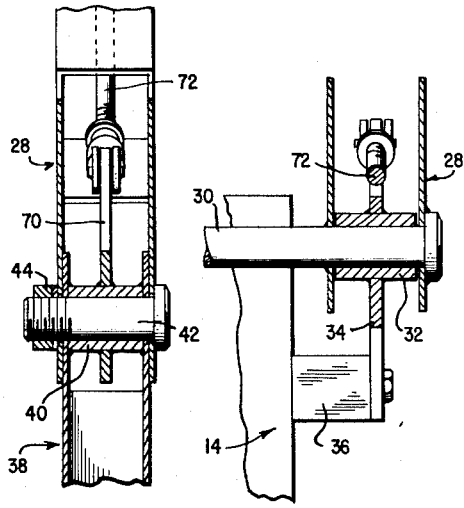
FIG. 6
FIG. 7
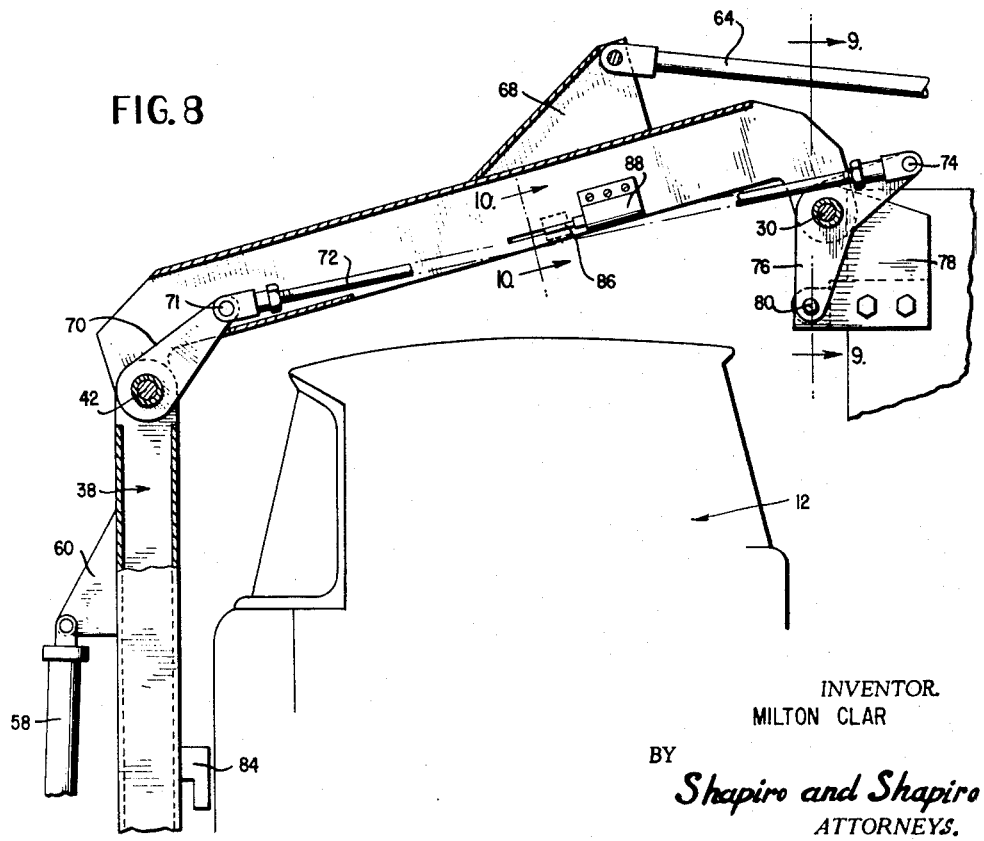
FIG. 8
INVENTOR.
MILTON CLAR
BY
*Shapiro and Shapiro*
ATTORNEYS.

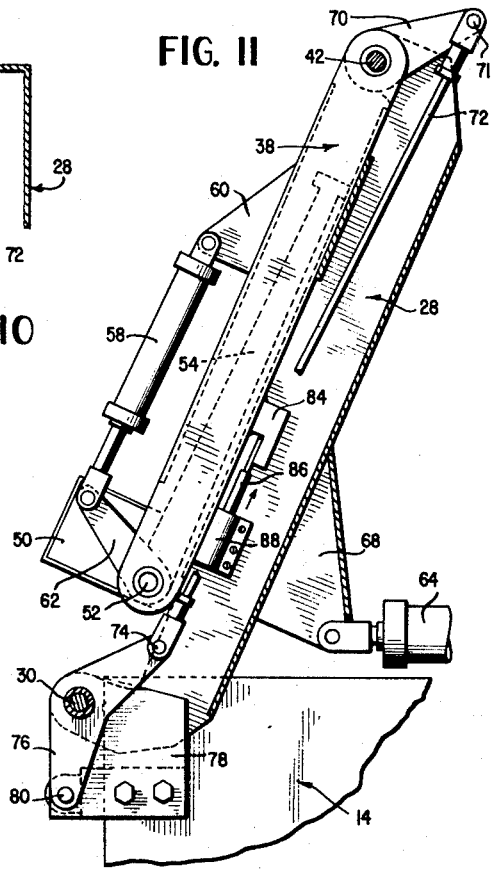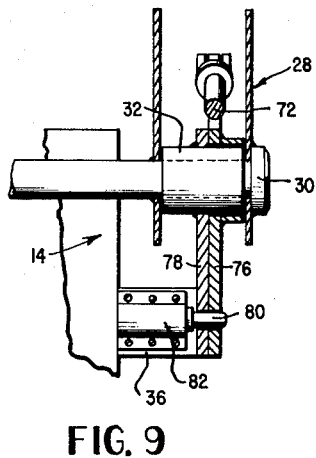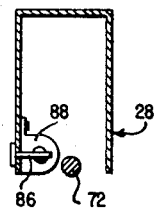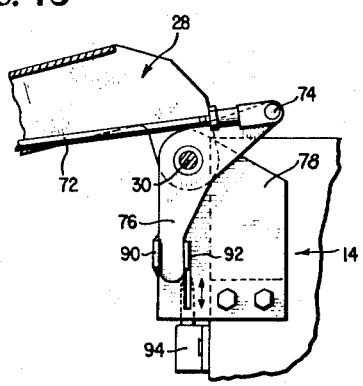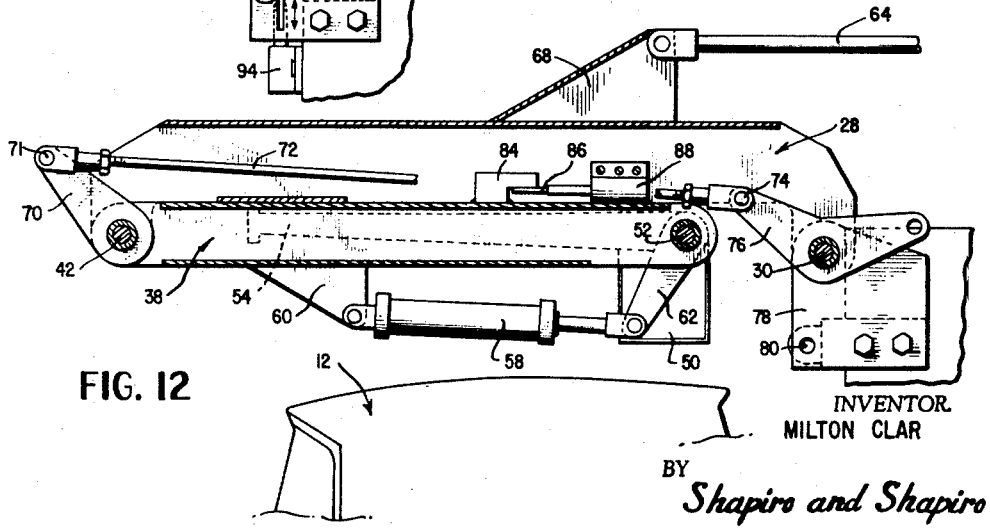

United States Patent Office 3,140,787
Patented July 14, 1964

3,140,787
SELF-LOADING VEHICLE
Milton Clar, Silver Spring, Md., assignor to Clar-Shayne, Washington, D.C., a partnership
Filed Apr. 11, 1962, Ser. No. 186,810
12 Claims. (Cl. 214—302)

This invention relates to self-loading vehicles, and more particularly to improvements in vehicle loading mechanisms, and in lifting mechanisms.

This application is a continuation-in-part of Serial No. 95,701, filed on March 14, 1961.

In the refuse collection and other material handling industries, trucks are employed which incorporate a mechanism for lifting a container and emptying the same into the truck body. The container may be permanently attached to the lifting mechanism, or may be separable therefrom so that the container may remain at a convenient site for filling. The lifting mechanism may be mounted at the front, side, or rear of the truck, the truck being designated accordingly as a front loader, side loader, or rear loader. The present invention has primary application to, but is not limited to, a front loader.

Front loaders currently in use employ a pair of elongated lifting members which are pivoted at one end on the truck chassis and which support a container at the other end. The lifting members may be rigid or articulated and are located adjacent the opposite sides of the operator's cab. The lifting force is usually obtained from hydraulic rams which pull or push the respective lifting members. Such mechanisms lift a container and move it rearwardly over the cab to an access opening at the top of the truck body. Then the mechanism inverts the container, so that the contents are dumped into the truck body.

Various types of pivoted lifting members have been proposed heretofore in an attempt to perform the foregoing functions in a manner which (1) provides good lifting efficiency, (2) prevents arm deformation under heavy loads, (3) minimizes clearance problems with respect to adjacent structures, (4) provides long operating life with minimum maintenance, and (5) maintains free access to the operator's cab regardless of the position of the arms. With most of the pivoted lifting members employed heretofore, the orientation of the container changes as the arms are raised. The container tends to tip as it is lifted, resulting in premature spillage of the container contents, particularly when the container is filled to capacity. The common expedient employed to overcome this problem requires the re-orientation of the container-engaging means as the lifting members are raised, but this procedure necessitates the attention of the driver to an extra control and is especially undesirable with unskilled labor.

It is accordingly a principal object of the invention to provide an improved lifting mechanism for a container or other load in which the orientation of the container or load is automatically controlled as the container or load is lifted to a position for dumping.

Another object of the invention is to provide an improved self-loading vehicle.

A further object of the invention is to provide improved lifting and dumping mechanisms.

Still another object of the invention is to provide apparatus of the foregoing type in which full cab clearance is maintained at all times, and in which there is minimum lateral projection and maximum space for accommodating a container or other load.

Yet another object of the invention is to provide apparatus of the foregoing type which minimizes the overhead clearance required for operation.

A further object of the invention is to provide apparatus of the foregoing type in which lifting arms may be readily tucked away when not in use.

An additional object of the invention is to provide apparatus of the foregoing type in which lifting arms follow a prescribed path permitting the arms to be located close to the front of the vehicle chassis in a lowered position, and to be raised with minimum inclination commensurate with the required cab clearance.

Another primary object of the invention is to provide a unique mechanism for causing lifting arms to assume a carefully controlled orientation throughout movement from a load engaging to a load dumping position.

A further object of the invention is to provide a mechanism of the last-mentioned type having parts which occupy minimum space and obviate external clearance problems and yet which are correctly proportioned so as to provide adequate strength for the assumption of lifting and orienting loads.

An additional object is to provide a mechanism of this type employing a uniquely modified parallelogram mechanism.

Still another object of the invention is to provide an improved apparatus for engaging and supporting container loads.

Briefly stated, and without limitation, in a specific form the present invention is concerned with a front loading vehicle having a vehicle chassis with an operator's cab at the front of the chassis and a refuse type body behind the cab. The loader mechanism of the invention comprises a pair of parallel booms which are pivotally mounted above and behind the operator's cab for movement about a horizontal axis, and from which is pivotally suspended a pair of lifting arms having means for engaging a load such as a container. If the lifting arms were rigidly attached to the booms, in effect to form a pair of rigid angulated lifting arms, the orientation of the load would vary radically as the arms were lifted. If, on the other hand, the lifting arms were freely suspended from the booms, a substantially constant orientation would be assumed, depending upon the center of gravity of the arms and the load, once the load were lifted from the ground. However, such orientation would differ from the desired orientation, would be erratic, and would introduce clearance problems. In accordance with the invention, a linkage is provided to cause the lifting arm orientation to follow a carefully controlled course as the booms are raised and lowered.

The foregoing and other objects, advantages, and features of the invention, and manner in which same are accomplished will become more readily apparent upon consideration of the following detailed description of the invention, taken in conjunction with the accompanying drawings, which illustrate preferred and exemplary embodiments, and wherein:

FIGURE 2 is a fragmentary side elevation view illustrating the position of the lifting mechanism just prior to dumping of the container;

FIGURE 3 is a fragmentary side elevation view illustrating the lifting mechanism with the load engaging means retracted;

FIGURE 4 is a front view of a self-loading vehicle of the invention;

FIGURE 5 is a fragmentary horizontal sectional view illustrating a portion of the apparatus for engaging and supporting the load;

FIGURE 6 is a fragmentary vertical sectional view illustrating the junction of a boom and its lifting arm and showing a portion of the linkage for controlling the orientation of the lifting arm;

FIGURE 7 is a fragmentary vertical sectional view illustrating the pivotal mounting of a boom and showing another portion of the linkage;

FIGURE 8 is a fragmentary vertical sectional view illustrating a modified form of the invention in which the lifting arms may be maintained folded against the booms;

FIGURE 9 is a sectional view taken along line 9—9 of FIGURE 8;

FIGURE 10 is a sectional view taken along line 10—10 of FIGURE 8;

FIGURE 11 is fragmentary side elevation view, partly in section, illustrating the raised folded position of a lifting arm and its associated boom;

FIGURE 12 is a vertical sectional view illustrating the lowered folded position of a lifting arm and its associated boom; and FIGURE 13 is a fragmentary side elevation view illustrating a detail of a modified form of the invention.

Figure 1:
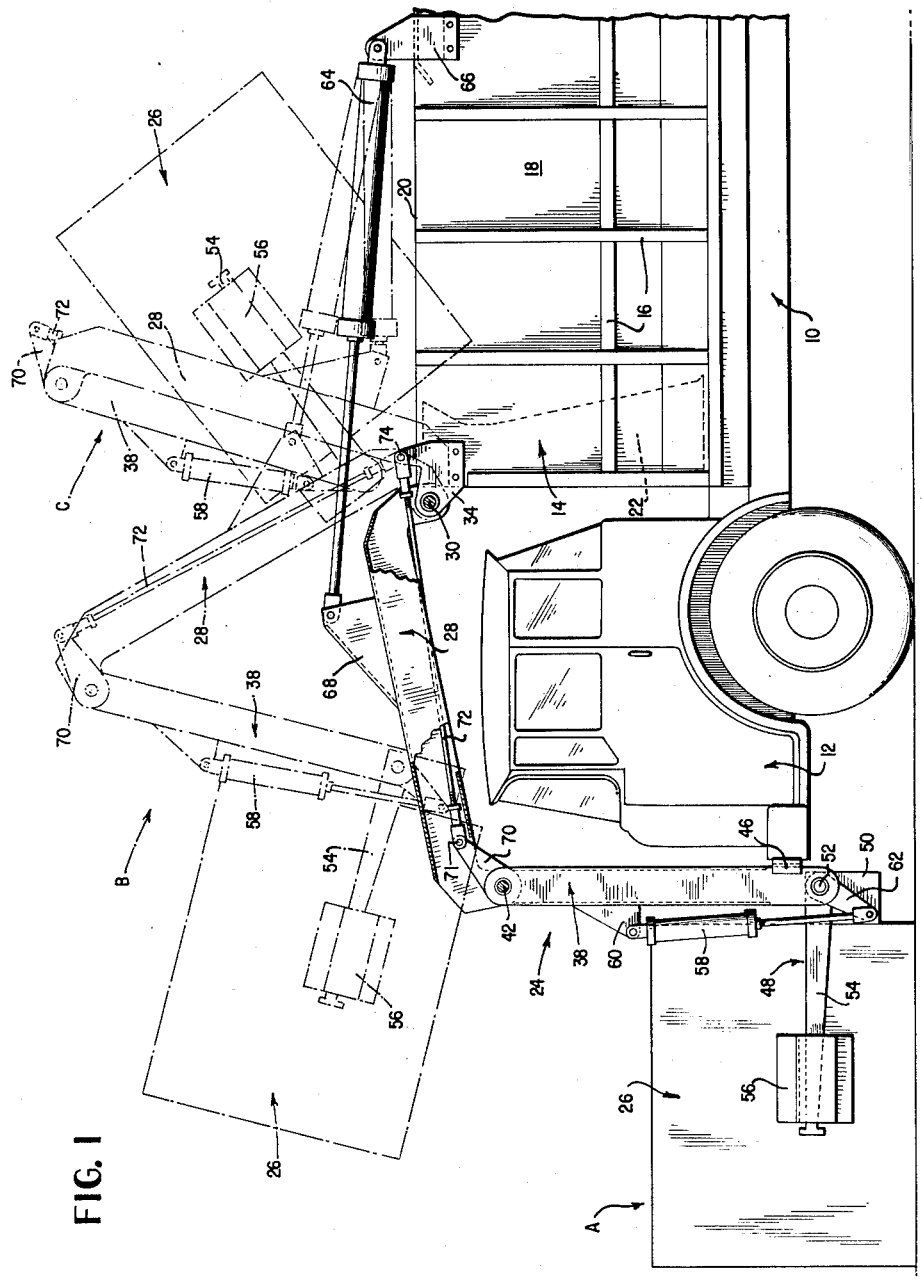
FIGURE 1 is a side elevation view, partly in section, of a front loading vehicle of the invention shown engaging, lifting, and dumping a container.

Referring to the drawings, and initially to FIGURES 1 and 4 thereof, a front loading vehicle may comprise a vehicle chassis 10 having an operator's cab 12 at the forward end thereof and a refuse type body 14 behind the cab. The body may be composed of a tubular framework 16 to which panels or sheathing 18 are applied, as by welding. The body has an access opening 20 at the top forward portion thereof and may contain a compaction mechanism generally designated by reference numeral 22. Such vehicles are well known in the refuse collection industry. The motorized vehicle chassis is usually supplied by one manufacturer, such as GMC, White, or Mack, and the body containing the compaction mechanism is usually supplied by another manufacturer, such as Hercules-Galion or Leach. The bodies are commonly of the push-out type or the dump type.

In accordance with the present invention, the vehicle is provided with a loader 24 for engaging and lifting a container 26 and for inverting the container to dump the contents thereof through the access opening 20 into the truck body 14. In the refuse collection industry the containers may range from a small size, say to two cubic yards, to a large size, say ten cubic yards. The containers are commonly of generally rectangular configuration and have an access opening at the top to permit the passage of refuse into and out of the container.

The loader 24 comprises a pair of parallel hollow booms 28, which have one end pivotally mounted for movement about a substantially horizontal axis. In accordance with the highly preferred form of the invention the mounting pivot 30 is located above and just behind the operator's cab 12, and the booms extend forwardly and downwardly at either side of the cab (see FIGURE 4). As shown in FIGURES 4 and 7, the pivot 30 may comprise a torque tube fixed to and extending between the booms 28 and turnable in bearing sleeves 32 supported on mounting plates 34 spaced from the sides of the body 14 by blocks 36, so as to permit movement of the booms without obstruction by the body. Blocks 36 are firmly mounted upon the body, or more specifically upon a strong frame member of the body. The torque tube 30 insures that the booms move in synchronism.

As shown, the booms are preferably of rectangular box cross-sectional configuration. This configuration provides the desired strength to resist deformation and at the same time minimizes the weight of the booms. In addition, as will be brought out more fully hereinafter, the hollow configuration of the booms is utilized to accommodate the movement of a linkage to be described.

At its forward end each boom pivotally supports a lifting arm 38 for movement about a horizontal axis. The arms are preferably of hollow rectangular box cross-sectional configuration. The pivotal connection between the lifting arms and the booms may assume the form shown in FIGURE 6, the sides of each lifting arm fitting closely within the sides of the associated boom and fixedly supporting a bearing sleeve 40, which receives a pivot pin 42 passed through the sides of the boom and lifting arm and retained by a nut 44.

In the position A illustrated in FIGURE 1, the lifting arms are substantially vertical, extending downwardly from the forward end of the booms to a location just beyond the front of the vehicle chassis. The lower ends of the lifting arms are spaced above the ground and are preferably accommodated by arm rests 46, which may take the form of channel pieces projecting laterally from the front of the vehicle chassis and open forwardly to receive the lifting arms (see FIGURE 4). The channel flanges restrict the lateral movement of the lifting arms, and the channel webs (preferably spaced slightly from the lifting arms) serve as buffers to accommodate rearward shocks applied to the lifting arms.

At their lower ends the lifting arms support a load engaging apparatus generally designated by reference numeral 48. In the form shown this apparatus comprises a rectangular hollow box member 50 extending between the lifting arms and pivotally mounted thereon for movement about a generally horizontal axis. The pivotal mounting at each arm may comprise a bearing sleeve 51 (FIGURE 5) having a pin 52 passing through the sides of the arm to receive a nut 53 within the box member, the sleeve being fixed to the box member, as by welding. The ends of the box member are spaced slightly inwardly of the lifting arms and have fixed thereto a pair of load engaging arms or forks 54 which are movable with the box member about the horizontal pivotal axis. The arms 54, which are merely representative of the many load engaging mechanisms employed in the industry, may be oriented so as to project forwardly substantially horizontally to engage cooperating elements of a load, such as the container 26. In the form shown in FIGURE 1 these elements comprise at the ends of the container a horizontal open-ended sleeve 56 affixed to the associated end wall of the container. The arms 54 are inserted into the corresponding sleeves by moving the vehicle forward to engage the container or by moving the container rearward to engage the vehicle.

To vary the orientation of the arms 54 and the box member 50, each lifting arm 38 has a hydraulic ram 58 mounted on the forward aspect thereof. The cylinder of each ram may be pivotally mounted on a bracket 60 at the front of the arm, the piston rod of the ram being pivotally attached to a crank arm 62 secured to the sleeve 51 as shown in FIGURE 5. By comparing FIGURES 1 and 3, it will be observed that the rams 58 may be actuated (by a conventional hydraulic circuit not shown) to turn the box member 50 and the load engaging arms 54 so that the arms may be moved to an upright, retracted position between the lifting arms 38. As will be later described, the rams may be further actuated to cause the load engaging arms 54 to turn beyond the position shown in FIGURE 3, to a dumping position. In the position of the box member shown in FIGURE 1 one side of the box member serves as a backing support for the container 26. This arrangement is particularly effective in supporting and orienting the container during lifting and dumping. When the arms 54 are retracted as shown in FIGURE 3, another side of the box member 50 is located forwardly of the vehicle, so that the box member serves as a bumper for the vehicle.

To raise the booms 28 a further pair of hydraulic rams 64 is employed (see FIGURES 1, 2, and 4). The cylinders of these rams may be pivotally mounted upon brackets 66 rigidly fixed to frame members at the upper portion of the body 14 in substantially the same planes as the mounting plates 34 on which the booms 28 are mounted. The piston rods of the rams are pivotally secured to brackets 58 mounted on the upper aspect of the booms.

If the lifting arms 38 were rigidly fixed to the booms 28, the lifting arms would assume a radically inclined orientation during the raising of the booms, and the container 26 would be tipped rearwardly at a sharp angle unless the rams 58 were manipulated during lifting so as to adjust the angle of the container engaging arms 54 to level the container. Thus, unless this cumbersome procedure were followed, the contents of the container would tend to spill over the cab as the container were lifted. On the other hand, if the lifting arms 38 were freely suspended from the booms, the weight of the container would urge the lifting arms backward into the cab, tipping the container forward, and it would be impossible to lift the container without obstruction from the cab or without unusually long booms. The present invention employs a linkage to cause the lifting arms 38 to assume a prescribed orientation during raising of the booms. If the lifting arms 38 were maintained vertical during raising of the booms, the arms would not clear the cab unless undesirably long booms were employed. This would necessitate excessive forward projection of the lifting arms beyond the front of the vehicle chassis, and the long booms would increase the overhead clearance required, which is also undesirable.

In accordance with the invention the lifting arms 38 are caused to assume a somewhat rearwardly inclined position during raising of the booms, so that the lower ends of the lifting arms clear the cab. By mounting the booms 28 just behind the cab, the length of the booms, and hence the overhead clearance required, is minimized, and by arranging the booms to slope downwardly and forwardly, the length of the lifting arms 38 is reduced, further alleviating the problem of cab clearance. To bring the container 26 back over the cab to a position above the access opening 20, the booms 28 are arranged to turn rearwardly beyond their pivotal mounting axis. This permits adequate inversion of the container without requiring an excessive rearward excursion of the container engaging arms 54. Moreover, in the dumping position the lifting arms 38 are arranged to be folded against the booms, whereby the lifting arms are firmly supported during the inversion of the container. Since there is no obstruction between the lifting arms or the booms, the container is free to turn between them. It now remains to describe the manner in which the controlled movement of the lifting arms is achieved.

In accordance with the invention the controlled movement of the lifting arms is accomplished by means of an asymmetrical linkage which resembles but differs significantly from a parallelogram linkage. Referring to FIGURES 1 and 6, each lifting arm has fixed thereto a crank arm or link 70, which extends upwardly and rearwardly from the sleeve 40. The crank arms 70 pass into the associated booms 28, and the booms are open at forward and lower portions to accommodate insertion of the crank arms 70, just as the lifting arms 38 are open at forward and lower portions to accommodate insertion of the crank arms 62. Crank arms 70 turn with the lifting arms 38 about the axis of the pivotal connections of the lifting arms to the associated booms.

The end of each crank arm 70 is pivotally connected at a horizontal pivot 71 to one end of an elongated link or rod 72. The rods extend through the associated booms 28 and have their other end pivotally mounted at 74 upon plates 34 for movement about a horizontal axis spaced from the axis of pivots 30. The links 72 pass through openings at the bottom and rear of the booms. The effective length of the links may be adjusted, as by providing oppositely threaded portions at the ends of the links which may be turned into or out of the associated pivotal mountings and locked by means of nuts. This adjustment permits precise positioning of the lifting arms 38.

The main lifting load is assumed by the booms 28, while the links 72 and the crank arms 70 must only have the strength required to control the orientation of the lifting arms, a much smaller load. Hence the configuration, and specifically the cross dimensions, of the links 72 and the cranks 70 may be made small enough to permit movement within the booms 28 without obstruction. The arrangement of the invention by which this linkage operates within the booms eliminates the obstruction which would be created by having the linkage above or below the booms or by attempting to arrange the linkage laterally of the booms. It is thus a simple matter to use the highly efficient pulling mode of ram operation for lifting the booms.

In addition to the fact that, unlike the usual parallelogram mechanism, the links 72 and the crank arms 70 are moved within the booms 28, it will be noted that the booms are displaced to the same side of the pivots 30 and 42 as the links 72. Moreover, the distance between pivots 42 and 71 is made somewhat greater than the distance between pivots 30 and 74, the distance between pivots 71 and 74 being approximately the same as the distance between pivots 42 and 30 in the form shown. The effect of this is to cause the lifting arms 38 to assume a rearwardly inclined position as the booms 28 are raised. In FIGURE 1 this is illustrated by the change in orientation of the lifting arms 38 in moving from the position A to the phantom position B. It will be observed that in position B the box member 50 and the container 26 clear the forward upper extremity of the cab 12 by virtue of the lifting arm inclination. Yet the inclination of the container 26 is not sufficient to introduce problems of spillage.

When the booms reach the dumping position C shown in phantom in FIGURE 1 and more fully in FIGURE 2, they are tipped rearwardly over the body 14, and the lifting arms 38 are folded against the booms. Hydraulic rams 58 may then be actuated to cause the container engaging arms 54 to turn rearwardly beyond the lifting arms 38, inverting the container at an angle sufficient to insure dumping of the contents through the access opening 20 of the body. During container inversion the lifting arms are stabilized by being folded against the booms. As is well known in the industry, by making the container engaging arms 54 of lesser height than the height of the sleeves 56, the container will fall slightly when it is inverted, so as to jog the contents and insure efficient dumping. After container dumping, the rams 58 are moved to their former positions, and the rams 64 are actuated to return the container to the ground.

In a typical practical embodiment of the invention, the distance between the axes of pivots 30 and 42 is 88 inches; the distance between the axes of pivots 42 and 71 is 13 inches; the distance between the axes of pivots 30 and 74 is 11.77 inches; and the distance between the axes of pivots 71 and 74 is 88.25 inches. The distance between the axes of pivots 42 and 52 is 70.75 inches. The difference in height between the axes of pivots 30 and 74 is 6⅜ inches, and the horizontal spacing of these axes is 9⅞ inches. The axis of pivot 30 is located 3.25 inches in front of the body 14. The maximum overhead excursion of the lifting mechanism is 17 ft. 2½ inches.

From observing FIGURE 4 it will be seen that the booms, the lifting arms, and the hydraulic rams at the respective sides of the vehicle lie in a pair of parallel vertical planes which are located close to the sides of the chassis and the body. Lateral projection of the loader is minimized, and there is maximum space to accommodate a container or other load.

A modification of the invention will now be described in which the lifting arms may be maintained folded against the booms even when the booms are in their lowered position. In essence this is accomplished by utilizing links 76 (FIGURES 8, 11, and 12) which are separate from the associated mounting plates 78 for the booms and which may be selectively locked to the mounting plates or permitted to turn with respect to the mounting plates about the axis of pivots 30. The pivots 74 for the links 72 may thus remain in fixed position (FIGURE 8), in which event the apparatus operates as before, or may be permitted to describe an arc about the pivots 30 (FIGURE 12), in which event the lifting arms may remain folded against the booms.

FIGURE 9 illustrates one means for selective control of the locking and unlocking of the links 76. As shown, each link 76, which resembles a bell crank, has an opening aligned with an opening in the associated mounting plate 78, through which a pin 80 may pass to lock the link to the plate. The insertion or withdrawal of the pin is controlled by a motive device 82 which may be a solenoid or a small hydraulic ram. With the pin inserted in the position shown in FIGURE 9 the link 76 is locked in position, and when the pin is withdrawn, the link may turn about the pivot 30. It now remains to insure that the lifting arms stay folded against the booms.

This may be accomplished by providing cooperating latch elements on the lifting arms and the booms. In the form shown in FIGURE 11 the lifting arms are provided with latch plates 84 affixed thereto. The latch plates are inserted in the booms when the lifting arms are folded and may be held inserted by means of sliding bolts 86 (FIGURES 10 and 11) moved by motive devices 88, such as solenoids or small hydraulic rams. If devices 88 are positioned to extend the bolts 86 after the latch plates 84 are inserted in the booms, the lifting arms are prevented from unfolding. If devices 82 are positioned to withdraw the pins 80, the lifting arms will be free to move with the booms when the booms are lowered as shown in FIGURE 12, links 76 turning about pivots 30 in the manner previously described. In the rest position shown in FIGURE 12 the container engaging arms 54 are folded up between the lifting arms. Hydraulic rams 58 and the devices 82 and 88 are preferably interlocked electrically or hydraulically in accordance with well known techniques, so that devices 82 can only be actuated to withdraw the pins 80 when devices 88 are actuated to extend the bolts 86 and hydraulic rams 58 are positioned to retract the container engaging arms. Conversely, the interlock should provide that devices 88 can not be actuated to withdraw the bolts 86 unless the booms are raised and devices 82 are actuated to extend the pins 80. Such an interlock system can be readily accomplished by the use of microswitches and the like for sensing the positions of the various parts. For example, if devices 82 and 88 are solenoids, they may have a common energization circuit, which can only be opened or closed when microswitches sense that the booms are fully raised and that the container engaging arms are retracted.

FIGURE 13 illustrates a slight modification of the arrangement for holding or releasing the links 76. In this form, abutment plates 90 are fixed to the forward side of the mounting plates 78, and vertically reciprocating latch plates 92 actuated by motive devices 94 are arranged to move upwardly to retain the lower extremities of the links 76 or to move downwardly to release the links. It is again preferred that device 84 be interlocked with devices 88 and rams 58 as previously described.

It is thus apparent that the present invention provides an improved self-loading vehicle having unique characteristics. While preferred embodiments of the invention have been shown and described, it will be apparent to those skilled in the art that changes can be made in these embodiments without departing from the principles and spirit of the invention, the scope of which is defined in the appended claims. Certain features of the invention may be utilized in the absence of other features under appropriate circumstances. Moreover, the terms "booms," "lifting arms," "container engaging arms," etc. are merely representative of language for describing the parts of the invention, and other terms, such as "articulated lifting members" or "angulated lifting arms" may also be used to describe the invention. Accordingly, the foregoing embodiments are to be considered illustrative, rather than restrictive of the invention, and those modifications which come within the meaning and range of equivalency of the claims are to be included therein.

The invention claimed is:

1. A front loading vehicle of the type described, comprising a vehicle chassis having an operator's cab mounted at the front of the chassis and having a body mounted on the chassis behind the cab, said body having an access opening at the top, a loading mechanism including a pair of booms, a pair of lifting arms, and load engaging means, each boom being pivotally mounted at one end on said vehicle adjacent the top-rear of said cab for movement in a substantially vertical plane and having one of said lifting arms pivotally suspended at one end thereof from the other boom end, said load engaging means being supported upon said lifting arms, means for moving said booms from a lowered position in which said booms extend forwardly and said lifting arms extend downwardly adjacent the front of said cab, and a raised position in which said booms extend upwardly and said lifting arms extend downwardly adjacent said body access opening, and means positively turning said lifting arms relative to said booms as said booms are moved, to ensure predetermined orientation of said arms.

2. The vehicle of claim 1, further comprising means for turning said load engaging means with respect to said lifting arms to permit dumping a load between said arms into said body access opening.

3. The vehicle of claim 1, said booms and the corresponding lifting arms being mounted for movement in substantially vertical planes at the respective sides of said cab without obstructing the access to said cab.

4. The vehicle of claim 1, the pivotal mounting of said booms having a substantially horizontal pivotal axis and the pivotal suspension of said lifting arms having a substantially horizontal pivotal axis, said arm turning means comprising at least one crank arm fixed to one of said lifting arms for movement about its suspension axis and at least one elongated link having one end thereof pivotally connected to said crank arm for movement about a substantially horizontal axis spaced from said suspension axis and having the other end thereof pivotally mounted on said vehicle for movement about a substantially horizontal axis spaced from the mounting axis of said booms.

5. The vehicle of claim 4, said booms being hollow and having openings therein, there being a pair of said crank arms and a pair of said elongated links associated with the respective lifting arms, said links and said crank arms extending into said booms through said openings, said links and said crank arms being dimensioned to permit movement thereof within said booms, the pivotal axis of said one end of said links to said crank arms being rearward and upward of the suspension axis of said arms, and the pivotal axis of said other end of said links being rearward and upward of the mounting axis of said booms.

6. The vehicle of claim 5, said booms sloping downwardly in said lowered position with said lifting arms suspended substantially vertically, the distance between the axis of pivotal connection of said links and said crank arms and the axis of the pivotal suspension of said lifting arms being greater than the distance between the pivotal mounting axis of said booms and the pivotal mounting axis of said links, whereby said arms move upwardly in rearwardly inclined orientation.

7. The vehicle of claim 4, said lifting arms being folded against said booms in said raised position, means for retaining said lifting arms folded against said booms, and means for permitting the folded lifting arms to move with said booms, the last-mentioned means comprising means for permitting said mounting axis of said link to turn about said mounting axis of said booms.

8. The vehicle of claim 1, said booms and the associated lifting arms being located so as to lie in two substantially parallel vertical planes in close proximity to opposite sides of said vehicle chassis, whereby there is minimum lateral projection of the booms and lifting arms beyond the sides of the chassis and maximum space between the booms and lifting arms for accommodation of a load.

9. The vehicle of claim 1, said means for moving said booms comprising a pair of hydraulic rams having one end pivotally mounted rearwardly of the pivotal mounting of said booms and the other end pivotally connected to the upper side of said booms, respectively.

10. The vehicle of claim 1, said booms extending rearwardly in said raised position with said lifting arms folded substantially against said booms.

11. The vehicle of claim 1, further comprising means joining said booms adjacent their pivotal mounting for ensuring synchronized movement of said booms.

12. The vehicle of claim 11, further comprising a polygonal box member extending between the lower ends of said lifting arms and turnable upon said lifting arms about a substantially horizontal axis, said load engaging means comprising a pair of load engaging arms fixed adjacent the respective ends of said box member and movable with said box member about its turning axis between raised and lowered positions, said box member serving as a backing support for a load engaged by said load engaging arms when the load engaging arms are lowered and serving as a protective bumper when the load engaging arms are raised.

References Cited in the file of this patent
UNITED STATES PATENTS

| | | |
|---|---|---|
| 2,501,112 | Webster | Mar. 21, 1950 |
| 2,660,322 | Richey | Nov. 24, 1953 |
| 2,824,655 | Harbers | Feb. 25, 1958 |
| 2,900,096 | Dempster et al. | Aug. 18, 1959 |
| 2,908,411 | Ambarcumian | Oct. 13, 1959 |
| 2,980,271 | Ulinski | Apr. 18, 1961 |